Feb. 9, 1943.    L. B. CASE    2,310,394
CHECK
Filed July 21, 1941

INVENTOR.
L. B. CASE
BY J. H. Cook
ATTORNEY

Patented Feb. 9, 1943

2,310,394

UNITED STATES PATENT OFFICE 2,310,394

CHECK

Lewis B. Case, St. Louis, Mo.

Application July 21, 1941, Serial No. 403,296

1 Claim. (Cl. 282—8)

This invention relates to checks, particularly to bank checks. Its principal object is to produce a check and an associated stub which will provide the minimum of opportunities for discrepancies between the check and stub, and also result in a saving of time by writing both check and stub simultaneously, leaving only the computation to arrive at the balance to be done on the stub after the check has been drawn. Another advantage is that the stub presents a perfectly flat writing surface, since it eliminates the necessity of positioning the stub close to the binding of the check book as is ordinarily done where the stub and check are printed on the same leaf of the check book. A still further advantage is found in the printing of the background of the check in such a manner that the eye is directed in logical sequence from the date to the name of the payee, then to the amount, and then to the signature, so that if any one of these items is inadvertently left out the omission will at a glance catch the attention of the person writing the check.

Fig. 2 is a top plan view of a check with the blank spaces filled in.

The invention comprises a check 1 bearing on its face the usual indicia and blank spaces to be filled in with the date, amount of the check, name of the payee, signature, etc., but as these are not part of the present invention they will not be further described.

A stub 2 is positioned underneath the check 1. On its face the stub 2 bears a date line which registers exactly with the date line on the check; the words "Issued to" followed by a line which register exactly with the words "Pay to the order of" and the following line adapted to receive the name of the payee on the check; a short line which registers exactly with the the short line on the check adapted to receive the amount of the check written in figures; a blank line which registers exactly with the blank line on the check adapted to receive the amount of the check written out in words; the word "For" followed by a line which registers exactly with the word "For" and its following line on the check; and a solidly inked in area which registers exactly with the space for the signature on the check. It will be obvious from the above description that when a piece of carbon paper 3 is inserted between the check 1 and the stub 2 and the check is drawn, all the information on the check will be simultaneously written on the stub.

In addition to the above the stub bears on its face, immediately underneath the date line, the words "Date of deposit," followed by a line, which is followed by the words "Amount deposited." Adjacent its right-hand margin and extending from the top almost to the solidly inked in area the stub has a boxed off section, in which, just under the top edge of the stub, appear the words "Balance brought forward," under which a horizontal line 4 is provided to receive the amount of such balance. Underneath the line 4 a horizontal line 5 appears on which may be indicated the amount of money being deposited, if a deposit is being made, said line 5 being in the same plane as the words "Amount deposited" previously mentioned. Underneath the line 5 there is a horizontal line 6 preceded by the words "Total balance." The short line previously mentioned which receives the amount of the check written in figures appears underneath the line 6. Underneath the last-mentioned line appear the words "Balance carried forward," and underneath said words a line 7 is provided to receive the figures indicating such balance.

Figure 1:
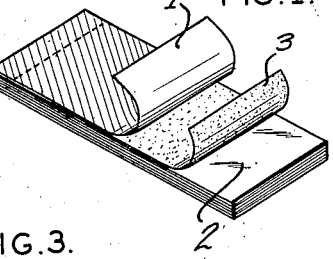
Fig. 1 is a perspective of a book of checks, illustrating particularly a check, its associated stub, and a sheet of carbon paper therebetween.

When a check is to be drawn, a sheet of carbon paper 3 is first inserted between the check 1 and the stub 2 (Fig. 1), and from the above description it will be obvious that as the check is filled in all the data written thereon will be simultaneously transmitted to the stub through the carbon. When the check has been torn off at the scored line 8 and the carbon paper is removed, the face of the stub is uppermost. The balance from the previous stub is written on line 4 under the words "Balance brought forward," the amount of the deposit being made (if any) is written on line 5, and the sum of these two amounts is entered on line 6 following the words "Total balance," where, as will be seen by referring to Fig. 3, it will be exactly above the amount of the check just drawn which has been written on the stub through the carbon paper, so that the amount of the check can be conveniently subtracted from the total balance, and this subtraction will give the correct amount to be inserted on line 7 under the words "Balance carried forward." The solidly inked in area 9 eliminates the possibility of the signature being transmitted to the stub through the carbon, and thus offers a precaution against forgery.

It will be seen from the above that through this invention the opportunities for error in filling out the stub are greatly decreased, since all the data appearing on the check will be simultaneously written on the stub in exactly the right places.

Figure 2:
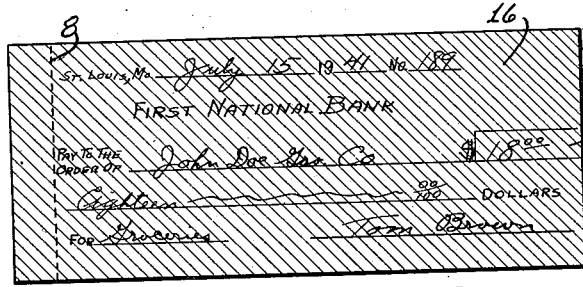
Figure 4:
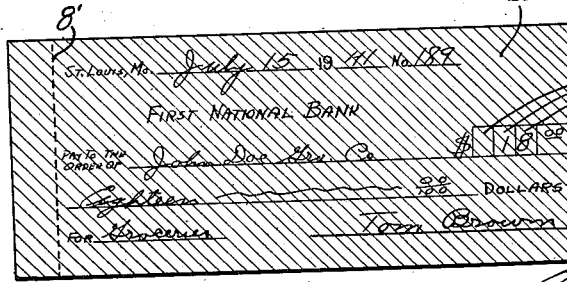
Fig. 4 is a modification of the check illustrated in Fig. 2.

In Fig. 4 I have illustrated a modification of the check shown in Fig. 2. In this form of the invention the check 1' is provided with the same indicia and blank lines as the check 1, but in addition thereto it has a boxed off section 10 adjacent its right-hand margin for the reception of the amount of the check where it is written in figures, said section 10 being divided by vertical lines 11 into spaces for dollars and cents columns.

Figure 3:
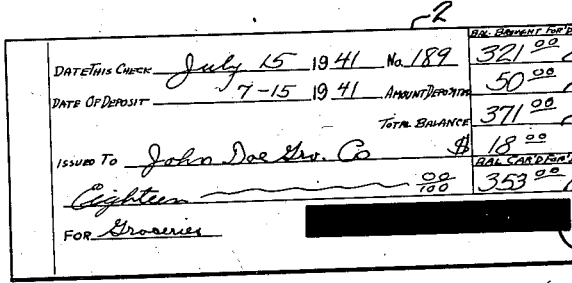
Fig. 3 is a top plan view of the stub associated with the check illustrated in Fig. 1.
Figure 5:
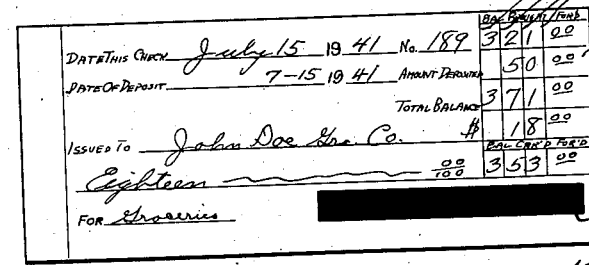
Fig. 5 is a top plan view of the stub associated with the check illustrated in Fig. 4.

In Fig. 5 I have illustrated a similar modification of the stub shown in Fig. 3; that is to say, a boxed off section 12 is provided adjacent the right-hand margin of the stub 2' for the computation to arrive at the new balance after a check has been drawn and a deposit made, said section 12 being divided by vertical lines 13 into dollars and cents columns.

Figure 6:
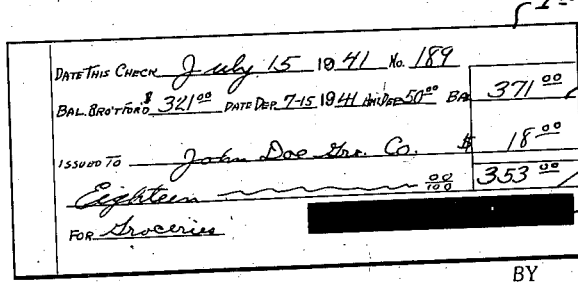
Fig. 6 is a modification of the stub, which can be associated with either of the checks illustrated in Figs. 2 and 4.

In Fig. 6 a still further modification of the stub is illustrated. In this modification the balance brought forward, the date of deposit, the amount deposited, and the balance all appear on a single horizontal line 14 underneath the date line on the stub 1ª, so that the total balance comes immediately above the amount of the check which has been written in figures through the carbon paper, and the balance left after the amount of the check has been subtracted can be conveniently entered on the line 15.

It is to be understood that the words of the legends appearing on the checks can be abbreviated or altered to suit the preferences of various banks without departing from the spirit of the invention.

As a precaution against inadvertent omissions or errors in drawing a check I print on the entire face of the check, in pale pastel shades, a multiplicity of parallel, diagonal lines 16 extending from the left-hand side downwardly toward the right-hand side of the check. The lines 16 serve to direct the eye in automatic progression from the upper left-hand corner to the lower right-hand corner of the check, so that it moves in sequence from the date, to the payee's name, to the amount, and then to the signature, and thus the omission of any one of these, or an error in one of the items, would be instantly noticed.

I claim:

In combination, a check blank and a stub blank positioned beneath said check blank, said check and stub blanks being adapted for the insertion of carbon paper therebetween, said check and stub blanks being provided with registering, designated spaces to permit of simultaneously drawing said check and recording same on said stub, and said stub having means consisting of vertical and horizontal lines forming boxed-in spaces for computing balances after said check has been drawn and a deposit made so that said balances will appear on said stub only but not on said check, and said stub having a solidly inked-in area to prevent the signature from being reproduced thereon when said signature is written on said check, and said check having diagonal lines extending from the upper left-hand corner to the lower right-hand corner adapted to direct the eye progressively from the first to the last of the items written on the check.

LEWIS B. CASE.